US008612095B2

(12) United States Patent
Kojo et al.

(10) Patent No.: US 8,612,095 B2
(45) Date of Patent: *Dec. 17, 2013

(54) VEHICLE DRIVING CONTROL APPARATUS

(75) Inventors: Takahiro Kojo, Gotenba (JP); Yoshiaki Tsuchiya, Mishikamo-gun (JP); Theerawat Limpibunterng, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/502,760

(22) PCT Filed: Jun. 23, 2010

(86) PCT No.: PCT/JP2010/060640
§ 371 (c)(1),
(2), (4) Date: Apr. 19, 2012

(87) PCT Pub. No.: WO2011/161777
PCT Pub. Date: Dec. 29, 2011

(65) Prior Publication Data
US 2012/0203431 A1    Aug. 9, 2012

(51) Int. Cl.
*B62D 12/00*    (2006.01)

(52) U.S. Cl.
USPC .......... 701/41; 701/3; 701/16; 114/163; 114/246; 114/253; 114/255; 114/330; 180/117; 180/120; 318/583

(58) Field of Classification Search
USPC .......... 701/3, 16, 41; 114/163, 246, 253, 330, 114/255; 440/11, 12, 30, 61 R, 61 S; 244/2, 244/50, 183, 3.11; 180/117, 120; 318/583
See application file for complete search history.

(56) References Cited

U.S. PATENT DOCUMENTS 4,881,700 A * 11/1989 Sarh .................... 244/2
4,986,493 A * 1/1991 Sarh .................... 244/2
(Continued)

FOREIGN PATENT DOCUMENTS

EP    2 050 653 A1    4/2009
JP    10-152063    6/1998
(Continued)

OTHER PUBLICATIONS

International Search Report Issued Aug. 31, 2010 in PCT/JP10/60640 Filed Jun. 23, 2010.

(Continued)

*Primary Examiner* — McDieunel Marc
(74) *Attorney, Agent, or Firm* — Oblon, Spivak, McClelland, Maier & Neustadt, L.L.P.

(57) ABSTRACT

A vehicle driving control apparatus is provided at least with: a rudder angle varying device capable of changing a relation between a steering angle, which is a rotation angle of a steering input shaft, and a rudder angle, which is a rotation angle of steered wheels; and a trajectory controlling device for determining a control amount and controlling the rudder angle varying device such that a trajectory of a vehicle approaches a target driving route of the vehicle. The vehicle driving control apparatus is further provided with a correcting device for correcting (i) a rate of change in the rudder angle with respect to a steering amount of the steering input or (ii) the determined control amount, in accordance with whether or not a steering direction of the steering input inputted to the steering input shaft through a steering member by a driver of the vehicle is identical with a rudder angle control direction of the control amount determined by the trajectory controlling device.

5 Claims, 4 Drawing Sheets

(56) References Cited

U.S. PATENT DOCUMENTS

| | | | |
|---|---|---|---|
| 6,789,008 B2 | 9/2004 | Kato et al. | |
| 7,305,285 B2* | 12/2007 | Villaume et al. | 701/3 |
| 7,809,483 B2 | 10/2010 | Nishikawa | |
| 8,392,064 B2 | 3/2013 | Thrun et al. | |
| 2003/0213640 A1 | 11/2003 | Kato et al. | |
| 2005/0027402 A1 | 2/2005 | Koibuchi et al. | |
| 2005/0267661 A1 | 12/2005 | Iwazaki et al. | |
| 2006/0142921 A1 | 6/2006 | Takeda | |
| 2007/0192005 A1 | 8/2007 | Ishikawa et al. | |
| 2007/0225914 A1 | 9/2007 | Kawazoe et al. | |
| 2008/0091318 A1 | 4/2008 | Deng et al. | |
| 2008/0091321 A1 | 4/2008 | Nishikawa | |
| 2008/0195275 A1 | 8/2008 | Kojo et al. | |
| 2010/0114431 A1 | 5/2010 | Switkes et al. | |
| 2010/0168963 A1 | 7/2010 | Yamamoto | |
| 2010/0256869 A1 | 10/2010 | Lich et al. | |
| 2011/0264329 A1* | 10/2011 | Limpibunterng et al. | 701/41 |
| 2012/0029773 A1* | 2/2012 | Fujita et al. | 701/41 |
| 2012/0109411 A1 | 5/2012 | Tokimasa et al. | |
| 2012/0109414 A1 | 5/2012 | Kumabe et al. | |
| 2012/0109460 A1 | 5/2012 | Tokimasa et al. | |
| 2012/0123642 A1* | 5/2012 | Kojo | 701/41 |
| 2012/0123643 A1* | 5/2012 | Limpibuntering et al. | 701/42 |
| 2012/0197496 A1 | 8/2012 | Limpibunterng et al. | |
| 2012/0203431 A1 | 8/2012 | Kojo et al. | |
| 2012/0215406 A1 | 8/2012 | Tanimoto et al. | |
| 2012/0226417 A1 | 9/2012 | Nishikawa | |
| 2012/0253602 A1 | 10/2012 | Fujita et al. | |
| 2012/0303217 A1 | 11/2012 | Reichel et al. | |

FOREIGN PATENT DOCUMENTS

| | | |
|---|---|---|
| JP | 11 78934 | 3/1999 |
| JP | 11 245832 | 9/1999 |
| JP | 2004-098744 | 4/2004 |
| JP | 2005-153779 | 6/2005 |
| JP | 2005-172528 | 6/2005 |
| JP | 2005 343184 | 12/2005 |
| JP | 2006-143101 | 6/2006 |
| JP | 2006-206011 | 8/2006 |
| JP | 2007 160998 | 6/2007 |
| JP | 2007-302017 | 11/2007 |
| JP | 2008 13123 | 1/2008 |
| JP | 2008-120338 | 5/2008 |
| JP | 2008 137612 | 6/2008 |
| JP | 2008-162566 | 7/2008 |
| JP | 2008-174013 | 7/2008 |
| JP | 2008-213522 | 9/2008 |
| JP | 2009 190464 | 8/2009 |
| JP | 2009 226981 | 10/2009 |
| JP | 2010 89692 | 4/2010 |
| JP | 2010 120532 | 6/2010 |
| WO | 2010/073400 A1 | 7/2010 |

OTHER PUBLICATIONS

Office Action mailed Apr. 11, 2013, in co-pending U.S. Appl. No. 13/141,875.

* cited by examiner

VEHICLE DRIVING CONTROL APPARATUS

TECHNICAL FIELD

The present invention relates to a vehicle driving control apparatus for performing, for example, lane keeping assist (LKA) or the like in a vehicle provided with various steering mechanisms such as, for example, an electronic controlled power steering (EPS) and a variable gear ratio steering (VGRS).

BACKGROUND ART

This type of apparatus suggested is, for example, an apparatus for controlling an electric power steering and a braking pressure of each wheel in order to achieve a target rudder angle in a lane keeping mode of a vehicle and for controlling a steering gear ratio varying apparatus in order to reduce a yaw angle deviation and a lateral position deviation of the vehicle with respect to a driving route (refer to a patent document 1).

Alternatively, another apparatus suggested is an apparatus for reducing and correcting a control amount of steering control in accordance with a steering wheel operating state and a steering wheel operating direction if a conscious steering wheel operation by a driver is detected when a rudder angle of rear wheels of the vehicle is controlled to perform the steering control of the vehicle (refer to a patent document 2).

Alternatively, another apparatus suggested is an apparatus for reducing a target control amount of a target control torque if a steering direction of the target control torque is different from a steering direction of a steering torque and if there is control interference when the steering torque is controlled by an electric power steering apparatus such that the vehicle keeps driving on a driving lane (refer to a patent document 3).

Alternatively, another apparatus suggested is an apparatus for steering by controlling a motor current and rotationally controlling a steering motor such that the rudder angle is equal to the target rudder angle (refer to a patent document 4). Here, in particular, it is disclosed that the motor current is reduced in accordance with an increase in a steering torque value when a direction indicated by the steering torque value of a steering wheel detected by a torque sensor is equal to a direction of the target rudder angle and that the motor current is increased in accordance with the increase in the steering torque value when the direction indicated by the steering torque value is opposite to the direction of the target rudder angle.

PRIOR ART DOCUMENT

Patent Document

Patent document 1: Japanese Patent Application Laid Open No. 2007-160998
Patent document 2: Japanese Patent Application Laid Open No. Hei 11-245832
Patent document 3: Japanese Patent Application Laid Open No. 2009-190464
Patent document 4: Japanese Patent Application Laid Open No. Hei 11-078934

DISCLOSURE OF INVENTION

Subject to be Solved by the Invention

However, although the technologies described in the patent documents 1 to 4 allow the vehicle to follow a target route, there is room for improvement in a feeling for the driver.

In view of the aforementioned problem, it is therefore an object of the present invention to provide a vehicle driving control apparatus capable of suppressing the driver's uncomfortable feeling caused by responsiveness of the vehicle.

Means for Solving the Subject

The above object of the present invention can be achieved by a vehicle driving control apparatus provided with: a rudder angle varying device capable of changing a relation between a steering angle, which is a rotation angle of a steering input shaft, and a rudder angle, which is a rotation angle of steered wheels; and a trajectory controlling device for determining a control amount and controlling the rudder angle varying device such that a trajectory of a vehicle approaches a target driving route of the vehicle, the vehicle driving control apparatus provided with: a correcting device for correcting (i) a rate of change in the rudder angle with respect to a steering amount of the steering input or (ii) the determined control amount, in accordance with whether or not a steering direction of the steering input inputted to the steering input shaft through a steering member by a driver of the vehicle is identical with a rudder angle control direction of the control amount determined by the trajectory controlling device.

According to the vehicle driving control apparatus of the present invention, the vehicle driving control apparatus is provided at least with the rudder angle varying device and the trajectory controlling device. The rudder angle varying device can change the relation between the steering angle, which is the rotation angle of the steering input shaft, and the rudder angle, which is the rotation angle of the steered wheels. The rudder angle varying device conceptually includes various physical, mechanical, electrical, or magnetic apparatuses capable of varying the relation between the steering angle and the rudder angle in a stepwise or continuous manner. According to the rudder angle varying device, the relation between the steering angle and the rudder angle is not primarily or uniformly defined. For example, a ratio between the steering angle and the rudder angle can be changed, or the rudder can be change independently of the steering angle.

The trajectory controlling device, which is provided, for example, with a memory, a processor and the like determines the control amount and controls the rudder angle varying device such that the trajectory of the vehicle approaches the target driving route of the vehicle. Here, the "control amount" is a control amount corresponding to the rudder angle varying device (e.g. a control amount of the rudder angle) and a control amount for enabling the trajectory of the vehicle to approach the target driving route of the vehicle. In the determination of the control amount, various existing algorithms or the like can be applied. Specifically, for example, on the basis of images of the target driving route imaged by an in-vehicle camera or the like, curvature of the target driving route, a positional deviation between the vehicle and a white line or the like for defining the target driving route, and a yaw angle deviation and the like are calculated or estimated. On the basis of them, target lateral acceleration for enabling the trajectory of the vehicle to approach the target driving route is calculated or estimated. Then, on the basis of the calculated or estimated target lateral acceleration, the control amount is determined to obtain the target lateral acceleration, for example, caused by a change in the rudder angle by the rudder angle varying device.

According to a study by the present inventors, the following matter is found; namely, in the vehicle provided with the trajectory controlling device, if there is the artificial steering input inputted to the steering input shaft through the steering member by the driver (i.e. if there is an override), the steering by the driver and the control by the trajectory controlling device will likely interfere with each other, and the driver will likely feel uncomfortable. In particular, the steering by the driver is not linked to the control by the trajectory controlling device, and vehicle behavior becomes excessive or insufficient. Thus, the driver hardly predicts the vehicle behavior and possibly feels uncomfortable.

Specifically, for example, since the control by the trajectory controlling device is started a predetermined time later than a time point at which the driver starts to steer, the response of the vehicle is relatively fast until the control by the trajectory controlling device is started from the time point at which the driver starts to steer. On the other hand, since the response of the vehicle is relatively slow after the control by the trajectory controlling device is started, the driver possibly feels uncomfortable.

Incidentally, there is also considered a method of stopping the control performed by the trajectory controlling device at the time of the override; however, at the stop or restart of the control performed by the trajectory controlling device, the vehicle exhibits discontinuous behavior and the driver possibly feels uncomfortable.

Thus, in the present invention, by the correcting device which is provided, for example, with a memory, a processor and the like, (i) the rate of change in the rudder angle with respect to the steering amount of the steering input or (ii) the determined control amount is corrected, in accordance with whether or not the steering direction of the steering input inputted to the steering input shaft through the steering member by the driver of the vehicle is identical with the rudder angle control direction of the control amount determined by the trajectory controlling device.

Specifically, for example, if the steering direction is identical with the rudder angle control direction (e.g. if the driver steers to approach the target driving route such as the center of a lane), the rudder angle for enabling the trajectory of the vehicle to approach the target driving route is given in advance due to the control by the trajectory controlling device. Thus, the correcting device (i) reduces the rate of change in the rudder angle with respect to the steering amount or (ii) reduces the determined control amount (i.e. reduces the rudder angle given due to the control by the trajectory controlling device) to suppress the excessive response of the vehicle.

On the other hand, if the steering direction is not identical with the rudder angle control direction (e.g. if the driver pulls over the vehicle to the edge of the lane to avoid an obstacle or the like), the rudder angle for enabling the trajectory of the vehicle to approach the target driving route (i.e. the rudder angle opposite to the steering direction) is given in advance due to the control by the trajectory controlling device. Thus, the correcting device (i) increases the rate of change in the rudder angle with respect to the steering amount or (ii) reduces the determined control amount to suppress the insufficient response of the vehicle.

Thus, it is possible to reduce or eliminate a difference between the responsiveness of the vehicle from the time point at which the driver starts to steer to a time point at which the control by the trajectory controlling device is started and the responsiveness of the vehicle after the control by the trajectory controlling device is started. Thus, it is possible to suppress the driver's uncomfortable feeling caused by the responsiveness of the vehicle.

Incidentally, whether or not the steering direction is identical with the rudder angle control direction may be judged or determined, for example, on the basis of whether or not a positive or negative value of the steering angle is identical with a positive or negative value of the rudder angle, where a change in one direction in the steering angle and the rudder angle may be indicated by the positive value and a direction opposite to the one direction may be indicated by the negative value. Alternatively, whether or not the steering direction is identical with the rudder angle control direction may be judged or determined, for example, on the basis of the yaw angle deviation or the like of the vehicle after the steering input is performed by the driver.

In one aspect of the vehicle driving control apparatus of the present invention, the correcting device corrects the rate of change in accordance with a driving state of the vehicle.

According to this aspect, an operation intention of the driver is further reflected, and it is possible to further suppress the driver's uncomfortable feeling caused by the responsiveness of the vehicle.

The "driving state of the vehicle" means a difference between the target driving route and an actual trajectory of the vehicle (i.e. a so-called "lane following error"), or the like.

According to the study by the present inventors, it is found that in general, as the lane following error increases, the control amount of the control by the trajectory controlling device increases so that the trajectory of the vehicle approaches the target driving route, and that the operation intension by the driver tends to be hardly reflected.

In the present invention, however, since the rate of change is corrected in accordance with the driving state of the vehicle by the correcting device, the operation intension by the driver tends to be reflected relatively easily. Specifically, for example, the correcting device performs the correction such that the rate of change increases as the lane following error increases.

In another aspect of the vehicle driving control apparatus of the present invention, the correcting device performs the correction such that the rate of change increases in comparison with a case where the steering direction is identical with the rudder angle control direction, if the steering direction is different from the rudder angle control direction.

According to this aspect, it is possible to suppress the difference in the responsiveness of the vehicle between the case where the steering direction is identical with the rudder angle control direction and the case where the steering direction is different from the rudder angle control direction, which is extremely useful in practice.

In another aspect of the vehicle driving control apparatus of the present invention, the correcting device corrects the determined control amount in accordance with a relation between the target driving route and an actual position of the vehicle.

According to this aspect, it is possible to properly reflect the operation intension by the driver, which is extremely useful in practice.

For example, if the vehicle is driving in a place away from the target driving route, such as the edge of the lane, it is considered that the driver has some intension (e.g. a right turn, a left turn, a lane change, etc.). Thus, in the present invention, the control amount determined by the trajectory controlling device is corrected in accordance with the relation between the target driving route and the actual position of the vehicle by the correcting device. Specifically, for example, the correcting device performs the correction such that the control amount determined by the trajectory controlling device becomes smaller as the actual position of the vehicle deviates from the target driving route.

Incidentally, the correcting device performs the correction such that the control amount determined by the trajectory controlling device becomes larger as the actual position of the vehicle approaches the target driving route. By virtue of such configuration, the vehicle can keep driving on the target driving route relatively easily, which is extremely useful in practice.

The operation and other advantages of the present invention will become more apparent from Mode for Carrying Out the Invention explained below.

MODE FOR CARRYING OUT THE INVENTION

Hereinafter, embodiments of the vehicle driving control apparatus of the present invention will be explained with reference to the drawings.

<First Embodiment>

A first embodiment of the vehicle driving control apparatus of the present invention will be explained with reference to FIG. 1 to FIG. 4.

Figure 1:
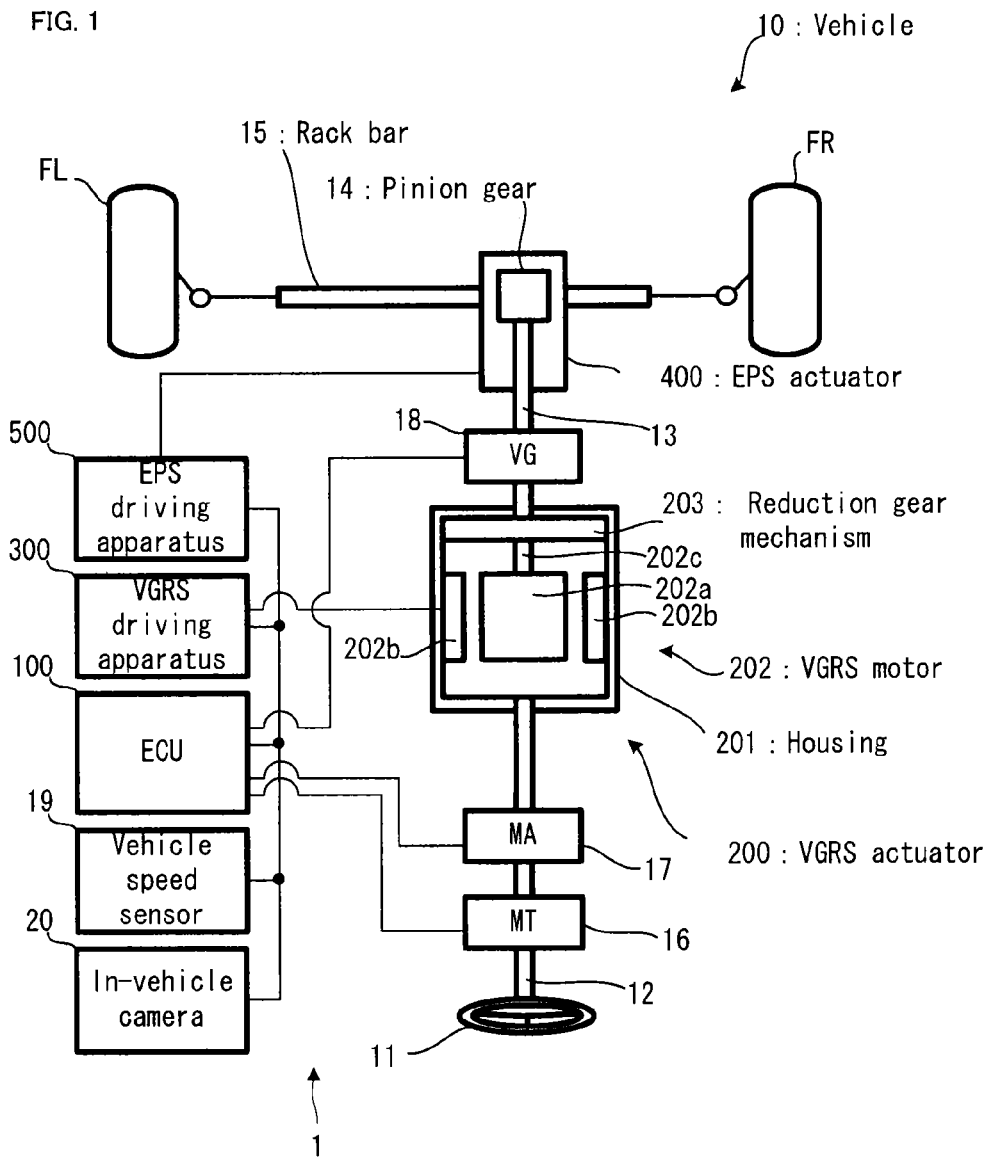
FIG. 1 is a schematic configuration diagram conceptually showing the configuration of a vehicle in a first embodiment.

Firstly, with reference to FIG. 1, an explanation will be given to the configuration of a vehicle in which the vehicle driving control apparatus in the embodiment is installed. FIG. 1 is a schematic configuration diagram conceptually showing the configuration of the vehicle in the embodiment.

In FIG. 1, a vehicle 10 is provided with a pair of front wheels FL and FR on either side as steered wheels, and it is configured to move in a desired direction by steering the front wheels. The vehicle 10 is provided with an electronic control unit (ECU) 100, a VGRS actuator 200, a VGRS driving apparatus 300, an EPS actuator 400, and an EPS driving apparatus 500.

The ECU 100 is provided with a central processing unit (CPU), a read only memory (ROM), and a random access memory (RAM), each of which is not illustrated, and it is an electronic control unit capable of controlling all the operations of the vehicle 10. The ECU 100 is configured to perform each of LKA control, EPS control and VGRS control, in accordance with a control program stored in the ROM. Here, the LKA control is control to make the vehicle 10 follow a target driving route (lane). Incidentally, the ECU 100 is one example of the "trajectory controlling device" of the present invention.

In the vehicle 10, a steering input given by a driver through a steering wheel 11 (also generally referred to as a "handle" in Japanese) is transmitted to an upper steering shaft 12 which is coaxially rotatably coupled with the steering wheel 11 and which is a shaft body capable of rotating in the same direction as the steering wheel 11. The "steering wheel 11" and the "upper steering shaft 12" in the embodiment are one example of the "steering member" and the "steering input shaft" of the present invention, respectively. The upper steering shaft 12 is coupled with the VGRS actuator 200 at the end on the downstream side.

The VGRS actuator 200 is provided with a housing 201, a VGRS motor 202 and a reduction gear mechanism 203. The VGRS actuator 200 is one example of the "rudder angle varying device" of the present invention.

The housing 201 is a case or enclosure of a VGRS actuator 200 for accommodating the VGRS motor 202 and the reduction gear mechanism 203. To the housing 201, the upper steering shaft 12 described above is fixed at the end on the downstream side. The housing 201 can rotate integrally with the upper steering shaft 12.

The VGRS motor 202 is a DC brushless motor having a rotor 202a as a rotator, a stator 202b as a stationary part, and a rotating shaft 202c as the output shaft of a driving force. The stator 202b is fixed to the inside of the housing 201, and the rotor 202a is rotatably held within the housing 201. The rotating shaft 202c is coaxially rotatably fixed to the rotor 202a, and its end on the downstream side is coupled with the reduction gear mechanism 203.

The reduction gear mechanism 203 is a planetary gear mechanism having a plurality of rotational elements which can perform differential rotation (a sun gear, a carrier, and a ring gear). Out of the plurality of rotational elements, the sun gear is coupled with the rotating shaft 202c of the VGRS motor 202, and the carrier is coupled with the housing 201. Moreover, the ring gear is coupled with a lower steering shaft 13.

According to the reduction gear mechanism 203 having such a configuration, a rotational speed of the upper steering shaft 12 according to an operation amount of the steering wheel 11 (i.e. the rotational speed of the housing 201 coupled with the carrier) and a rotational speed of the VGRS motor 202 (i.e. the rotational speed of the rotating shaft 202c coupled with the sun gear) uniquely determine a rotational speed of the lower steering shaft 13 coupled with the ring gear which is the remaining one rotational element. At this time, it is possible to perform increase/reduction control on the rotational speed of the lower steering shaft 13 by performing increase/reduction control on the rotational speed of the VGRS motor 202 by means of the differential action between the rotational elements. In other words, the upper steering shaft 12 and the lower steering shaft 13 can perform relative rotation by the action of the VGRS motor 202 and the reduction gear mechanism 203. Moreover, in terms of the configuration of each rotational element in the reduction gear mechanism 203, the rotational speed of the VGRS motor 202 is transmitted to the lower steering shaft 13 in the state that it is reduced in accordance with a predetermined reduction ratio which is determined in accordance with a gear ratio between the rotational elements.

As described above, in the vehicle 10, since the upper steering shaft 12 and the lower steering shaft 13 can perform the relative rotation, a steering transmission ratio is continuously variable in a predetermined set range, wherein the steering transmission ratio is a ratio between a steering angle MA as the rotation amount of the upper steering shaft 12 and a rudder angle θst of the front wheels as the steered wheels which is uniquely determined according to the rotation amount of the lower steering shaft 13 (which is also related to the gear ratio of a rack and pinion mechanism described later).

Incidentally, the reduction gear mechanism 204 may have not only the planetary gear mechanism exemplified here but also another aspect (e.g. an aspect of making the upper steering shaft 12 and the lower steering shaft 13 perform the relative rotation by coupling gears, each of which has the different number of teeth, with the upper steering shaft 12 and the lower steering shaft 13, by disposing a flexible gear which is in contact with each gear in one portion, and by rotating the flexible gear by using a motor torque transmitted through a wave generator, or similar aspects). Alternatively, the reduction gear mechanism 204 may have physical, mechanical, or mechanistic aspect different from the aforementioned aspect even in the case of the planetary gear mechanism.

The VGRS driving apparatus 300 is an electric drive circuit, including a PWM circuit, a transistor circuit, an inverter and the like, capable of electrifying the stator 202b of the VGRS motor 202. The VGRS driving apparatus 300 is electrically connected to a not-illustrated battery, and it can supply a drive voltage to the VGRS motor 202 by using an electric power supplied from the battery. Moreover, the VGRS driving apparatus 300 is electrically connected to the ECU 100, and its operations are controlled by the ECU 100. Incidentally, the VGRS driving apparatus 300 is one example of the "rudder angle varying device" of the present invention, together with the VGRS actuator 200.

The rotation of the lower steering shaft 13 is transmitted to a rack and pinion mechanism. The rack and pinion mechanism is a steering force transmission mechanism including a pinion gear 14 connected to the lower steering shaft 13 at the end on the downstream side and a rack bar 15 in which gear teeth engaging with the gear teeth of the pinion gear are formed. The rotation of the pinion gear 14 is converted to motion in a horizontal direction in FIG. 1 of the rack bar 15, by which a steering force is transmitted to each steered wheel through a tie rod and a knuckle (whose reference numerals are omitted) coupled with both ends of the rack bar 15. In other words, in the vehicle 10, a so-called rack and pinion type steering method is realized.

The EPS actuator 400 is provided with an EPS motor as a DC brushless motor including: a not-illustrated rotor as a rotator to which a permanent magnet is attached; and a stator as a stationary part which surrounds the rotor. The EPS motor can generate an assist torque TA in the direction of rotation of the rotor, which is rotated by the action of a rotating magnetic field formed in the EPS motor due to the electrification to the stator through the EPS driving apparatus 500.

On the other hand, a not-illustrated reduction gear is fixed to a motor shaft as the rotating shaft of the EPS motor, and the reduction gear also engages with the pinion gear 14. Thus, the assist torque TA generated from the EPS motor functions as an assist torque for assisting the rotation of the pinion gear 14. The pinion gear 14 is coupled with the lower steering shaft 13 as described above, and the lower steering shaft 13 is coupled with the upper steering shaft 12 through the VGRS actuator 200. Therefore, a driver steering torque MT applied to the upper steering shaft 12 is transmitted to the rack bar 15 in the form that it is assisted by the assist torque TA, as occasion demands, by which the driver's steering load is reduced.

The EPS driving apparatus 500 is an electric drive circuit, including a PWM circuit, a transistor circuit, an inverter and the like, capable of electrifying the stator of the EPS motor. The EPS driving apparatus 500 is electrically connected to a not-illustrated battery, and it can supply a drive voltage to the EPS motor by using an electric power supplied from the battery. Moreover, the EPS driving apparatus 500 is electrically connected to the ECU 100, and its operations are controlled by the ECU 100.

On the other hand, the vehicle 10 is provided with various sensors including a steering torque sensor 16, a steering angle sensor 17, and a rotation sensor 18.

The steering torque sensor 16 is a sensor capable of detecting the driver steering torque MT applied through the steering wheel 11 from the driver. Explaining it more specifically, the upper steering shaft 12 has such a configuration that it is divided into an upstream part and a downstream part and that the parts are mutually coupled by using a not-illustrated torsion bar. To the both ends on the upstream side and the downstream side of the torsion bar, rings for detecting a rotational phase difference are fixed. The torsion bar is twisted in its rotational direction in accordance with the steering torque (i.e. the driver steering torque MT) transmitted via the upstream part of the upper steering shaft 12 when the driver of the vehicle 10 operates the steering wheel 11, and the torsion bar can transmit the steering torque to the downstream part with the twist generated. Therefore, upon the transmission of the steering torque, there is the rotational phase difference between the rings for detecting the rotational phase difference described above. The steering torque sensor 16 can detect the rotational phase difference, convert the rotational phase difference to the steering torque, and output it as an electrical signal corresponding to the driver steering torque MT. Moreover, the steering torque sensor 16 is electrically connected to the ECU 100, and the detected driver steering torque MT is referred to by the ECU 100 with a regular or irregular period.

The steering angle sensor 17 is an angle sensor capable of detecting the steering angle MA which indicates the rotation amount of the upper steering shaft 12. The steering angle sensor 17 is electrically connected to the ECU 100, and the detected steering angle MA is referred to by the ECU 100 with a regular or irregular period.

The rotation sensor 18 is a rotary encoder capable of detecting a rotational phase difference $\Delta\theta$ between the housing 201 of the VGRS actuator 200 (i.e. which is equivalent to the upper steering shaft 12 in terms of a rotation angle) and the lower steering shaft 13. The rotation sensor 18 is electrically connected to the ECU 100, and the detected rotational phase difference $\Delta\theta$ is referred to by the ECU 100 with a regular or irregular period.

A vehicle speed sensor 19 is a sensor capable of detecting a vehicle speed V as the speed or velocity of the vehicle 10. The vehicle speed sensor 19 is electrically connected to the ECU 100, and the detected vehicle speed V is referred to by the ECU 100 with a regular or irregular period.

An in-vehicle camera 20 is an imaging apparatus which is disposed on the front nose of the vehicle 10 and which can image a predetermined area ahead of the vehicle 10. The in-vehicle camera 20 is electrically connected to the ECU 100, and the imaged area ahead is transmitted to the ECU 100 as image data with a regular or irregular period. The ECU 100 can analyze the image data and obtain various data necessary for the LKA control.

A vehicle driving control apparatus 1 in the embodiment is provided with the ECU 100 as one example of the "correcting device" of the present invention, for correcting (i) a rate of change in the rudder angle with respect to a steering amount of the steering input or (ii) the determined control amount, in accordance with whether or not a steering direction of the steering input inputted to the upper steering shaft 12 through the steering wheel 11 by the driver of the vehicle 10 is identical with a rudder angle control direction of the control amount associated with the VGRS driving apparatus 300 determined by the ECU 100.

In the embodiment, one portion of the ECU 100 for various electronic controls of the vehicle 10 is used as one portion of the vehicle driving control apparatus 1. Incidentally, the physical, mechanical and electrical configurations of the "correcting device" and the like of the present invention are not limited to the aforementioned configurations but may be configured as various computer systems or the like such as a plurality of ECUs, various processing units, various controllers or microcomputer apparatuses.

Figure 2:
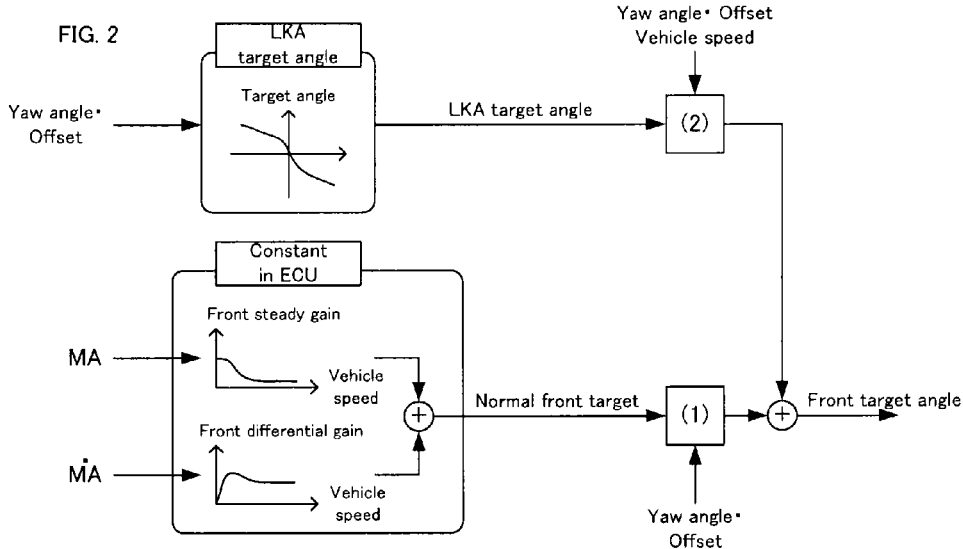
FIG. 2 is a control outline view showing a vehicle driving control process performed by an ECU in the first embodiment.

Next, with reference to FIG. 2, an explanation will be given to a vehicle driving control process performed by the ECU 100 as one portion of the vehicle driving control apparatus 1. FIG. 2 is a control outline view showing the vehicle driving control process performed by the ECU in the embodiment. In the embodiment, as a result of such an action that an operation button for initiating the LKA control, disposed in advance in the vehicle interior of the vehicle 10, is operated by the driver or similar actions, a LKA mode is selected.

The ECU 100 reads various signals including sensor signals or the like associated with the various sensors provided for the vehicle 10. The ECU 100 calculates or estimates, for example, a yaw angle (or a yaw angle deviation), offset (i.e. a deviation in the lateral direction between the vehicle 10 and a white line for defining the target driving route of the LKA), and the like, on the basis of the read signals or the like.

In FIG. 2, the ECU 100 determines from a map or the like a LKA basic target angle as one example of the "control amount" of the present invention, on the basis of the yaw angle and the offset. Then, the ECU 100 corrects the determined LKA basic target angle on the basis of a correction map as shown in FIG. 4 and the yaw angle, the offset, and the vehicle speed in FIG. 2(2), and calculates a LKA correction target angle which is the corrected LKA basic target angle.

Figure 4:
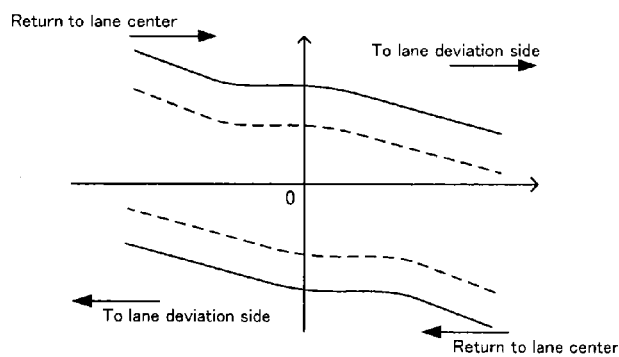
FIG. 4 is a conceptual diagram showing a concept of a correction map associated with a LKA.

FIG. 4 is a conceptual diagram showing a concept of the correction map associated with the LKA. In FIG. 4, a horizontal axis indicates the offset or the yaw angle deviation, and a vertical axis indicates a LKA allowable speed or LKA distribution gain. Incidentally, the origin (i.e. "0") on the horizontal axis accords with the target driving route.

In the embodiment, in particular, if a trajectory of the vehicle 10 changes in a direction of deviating from the target driving route, as it deviates from the target driving route, the LKA allowable speed or LKA distribution gain becomes smaller (refer to a first quadrant or a third quadrant in FIG. 4). On the other hand, if the trajectory of the vehicle 10 changes in a direction of approaching the target driving route, as it approaches the target driving route, the LKA allowable speed or LKA distribution gain becomes smaller (refer to a second quadrant or a fourth quadrant in FIG. 4).

Moreover, the LKA allowable speed or LKA distribution gain also changes depending on a steering speed of the steering wheel 11 steered by the driver. Specifically, if the steering speed is faster than a steering speed corresponding to the LKA allowable speed or LKA distribution gain shown by a solid line in FIG. 4, the LKA allowable speed or LKA distribution gain changes in a direction of reducing its absolute value, for example, as shown by a dashed line in FIG. 4.

Back in FIG. 2, if the steering wheel 11 is not steered by the driver (i.e. if there is no override), the calculated LKA correction target angle is a target angle for the front wheels FL and FR (i.e. a VGRS final target angle).

On the other hand, if the steering wheel 11 is steered by the driver (i.e. if there is override), the ECU 100 determines from a map or the like a VGRS basic target angle, which is a basic value of a relative rotation angle of the lower steering shaft 13 with respect to the steering angle MA, which is a rotation angle of the upper steering shaft 12, on the basis of the steering angle MA and a steering angular velocity which is temporal differentiation of the steering angle MA, in parallel with the calculation of the LKA correction target angle described above. Incidentally, the VGRS basic target angle is one example of the "ratio of change" of the present invention.

Figure 3:
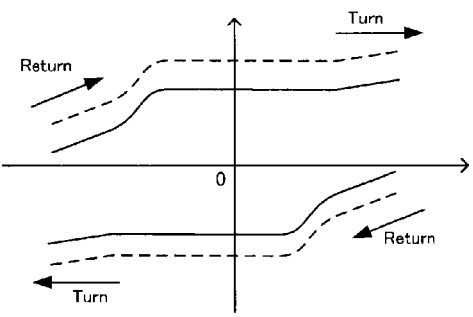
FIG. 3 is a conceptual diagram showing a concept of a correction map associated with a VGRS.

Then, the ECU 100 corrects the determined VGRS basic target angle on the basis of a correction map as shown in FIG. 3 and the yaw angle and the vehicle speed in FIG. 2(2), and calculates a VGRS correction target angle which is the corrected VGRS basic target angle.

FIG. 3 is a conceptual diagram showing a concept of the correction map associated with the VGRS. In FIG. 3, a horizontal axis indicates the offset or the yaw angle deviation, and a vertical axis indicates a VGRS allowable speed or VGRS distribution gain. Incidentally, the origin (i.e. "0") on the horizontal axis accords with the target driving route.

In the embodiment, in particular, if the vehicle 10 is steered in the direction of deviating from the target driving route (i.e. the steering wheel is turned), as it deviates from the target driving route, the VGRS allowable speed or VGRS distribution gain becomes larger (refer to a first quadrant or a third quadrant in FIG. 3). On the other hand, if the vehicle 10 is steered in the direction of approaching the target driving route (i.e. the steering wheel is returned), as it approaches the target driving route, the VGRS allowable speed or VGRS distribution gain becomes larger (refer to a second quadrant or a fourth quadrant in FIG. 3).

Moreover, the VGRS allowable speed or VGRS distribution gain also changes depending on the steering speed of the steering wheel 11 steered by the driver. Specifically, if the steering speed is faster than a steering speed corresponding to the VGRS allowable speed or VGRS distribution gain shown by a solid line in FIG. 3, the VGRS allowable speed or VGRS distribution gain changes in a direction of reducing its absolute value, for example, as shown by a dashed line in FIG. 3.

Back in FIG. 2, if there is the override, the ECU 100 sets an additional value of the calculated LKA correction target angle and the calculated VGRS correction target angle, as the target angle for the front wheels FL and FR.

If the target angle for the front wheels FL and FR is calculated, the ECU 100 controls the VGRS driving apparatus 300 (refer to FIG. 1) on the basis of the calculated target angle for the front wheels FL and FR and rotates the VGRS motor 202 of the VGRS actuator 202 by an amount corresponding to the calculated target angle for the front wheels FL and FR.

Now, a comparative example of the vehicle driving control apparatus 1 will be explained with reference to FIG. 5 to FIG. 7. Incidentally, the configuration of a vehicle in which the vehicle driving control apparatus in the comparative example is installed is the same as that of the vehicle 10 described above.

A control outline of a vehicle driving control process performed by the vehicle driving control apparatus in the comparative example is the same as the control outline shown in FIG. 2, except that one portion of the map used is different. Specifically, in FIG. 2(1), a correction map as shown in FIG. 5 is used when the determined VGRS basic target angle is corrected. Moreover, in FIG. 2(2), a correction map as shown in FIG. 6 is used when the determined LKA basic target angle is corrected.

Figure 5:
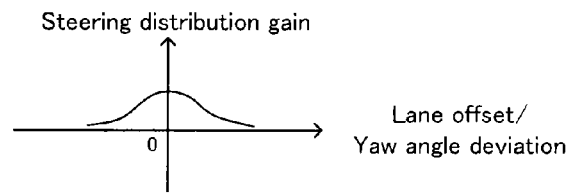
FIG. 5 is a view showing one example of a steering distribution gain map in a comparative example.

FIG. 5 is a view showing one example of a steering distribution gain map in the comparative example. In FIG. 5, a horizontal axis indicates the offset or the yaw angle deviation. Incidentally, the origin (i.e. "0") on the horizontal axis accords with the target driving route. As shown in FIG. 5, the steering distribution gain map in the comparative example is configured such that the input by the driver is reduced more as the trajectory of the vehicle deviates from the target driving route.

Figure 6:
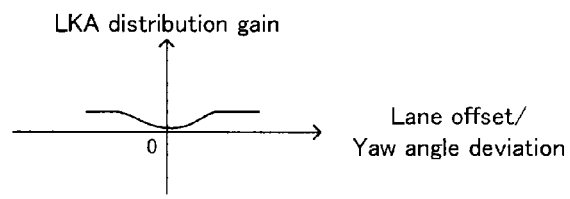
FIG. 6 is a view showing one example of a LKA distribution gain map in the comparative example.

FIG. 6 is a view showing one example of a LKA distribution gain map in the comparative example. In FIG. 6, a horizontal axis indicates the offset or the yaw angle deviation. Incidentally, the origin (i.e. "0") on the horizontal axis accords with the target driving route. As shown in FIG. 6, the LKA distribution gain map in the comparative example is configured such that correction of the LKA is allowed more as the trajectory of the vehicle deviates from the target driving route.

In other words, in the vehicle driving control process in the comparative example, as the trajectory of the vehicle deviates from the target driving route, the control associated with the LKA is prioritized over the steering input by the driver. To put it another way, in the vehicle driving control process in the comparative example, as the trajectory of the vehicle approaches the target driving route, the steering input by the driver is prioritized over the control associated with the LKA. In addition, the control associated with the LKA is started a predetermined time later than the steering input by the driver. Thus, vehicle behavior is possibly more than or less than behavior intended by the driver, which possibly makes the driver feel uncomfortable.

Specifically, this will be explained with reference to a time chart in FIG. 7. In FIG. 7, a "steering wheel angle", an "LKA angle", and a "pinion angle" mean a "steering angle," a "target angle associated with the LKA control", and a "final rudder angle of the vehicle", respectively.

Figure 7:
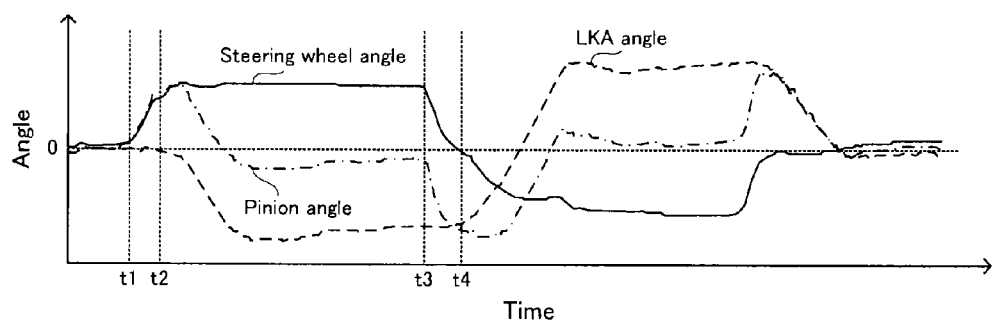
FIG. 7 is a view showing one example of a time chart showing a temporal change in each of a steering wheel angle, a pinion angle, and a LKA target angle of a vehicle in the comparative example.

It is assumed that when the LKA mode is selected, the driver steers the steering wheel 11 such that the trajectory of the vehicle deviates from the target driving route at a time point t1 in FIG. 7. The control associated with the LKA is not started until at a time point t2 in FIG. 7, and as described above, the steering input by the driver is prioritized as the trajectory of the vehicle approaches the target driving route. Thus, in a period from the time point t1 to the time point t2, the vehicle responds as intended by the driver.

On the other hand, after the time point t2, the LKA angle is set in a direction opposite to that of the steering input by the driver (i.e. the steering wheel angle), and as described above, the control associated with the LKA is prioritized as the trajectory of the vehicle deviates from the target driving route. Thus, the vehicle possibly does not turn as intended by the driver (refer to the pinion angle in FIG. 7). In other words, the response of the vehicle is relatively slow or the vehicle does not respond.

Therefore, due to a difference between the responsiveness of the vehicle in the period from the time point t1 to the time point t2 and the responsiveness of the vehicle after the time point t2, the driver possibly feels uncomfortable.

Moreover, it is also assumed that the driver steers the steering wheel 11 such that the trajectory of the vehicle approaches the target driving route at a time point t3 in FIG. 7. The control associated with the LKA is not started until a time point t4 in FIG. 7, and the LKA angle is set such that the trajectory of the vehicle approaches the target driving route. Thus, in a period from the time point t3 to the time point t4, the vehicle behavior is possibly excessive.

On the other hand, after the time point t4, the LKA angle is set in the direction opposite to the steering input by the driver due to the control associated with the LKA. Thus, the vehicle possibly does not turn as intended by the driver.

Therefore, due to a difference between the responsiveness of the vehicle in the period from the time point t3 to the time point t4 and the responsiveness of the vehicle after the time point t4, the driver possibly feels uncomfortable.

However, the vehicle driving control process associated with the vehicle driving control apparatus 1 is configured, as described above, such that the VGRS allowable speed or VGRS distribution gain becomes larger (refer to FIG. 3) and/or such that the LKA allowable speed or LKA distribution gain becomes smaller (refer to FIG. 4) if the driver steers the steering wheel 11 in such a direction that the trajectory of the vehicle 10 deviates from the target driving route (i.e. if the steering direction is not identical with the rudder angle control direction caused by the control associated with the LKA). Thus, the steering input by the driver is prioritized over the control associated with the LKA. As a result, the vehicle 10 responds as intended by the driver.

Moreover, it is configured, as described above, such that the VGRS allowable speed or VGRS distribution gain becomes smaller (refer to FIG. 3) and/or such that the LKA allowable speed or LKA distribution gain becomes smaller (refer to FIG. 4) if the driver steers the steering wheel 11 in such a direction that the trajectory of the vehicle 10 approaches the target driving route (i.e. if the steering direction is identical with the rudder angle control direction caused by the control associated with the LKA). Thus, it is possible to prevent that the steering by the driver causes the vehicle behavior to be excessive.

<Second Embodiment>

A second embodiment of the vehicle driving control apparatus of the present invention will be explained with reference to FIG. 8. In the second embodiment, except that the vehicle is a 4 wheel steering (4WS) vehicle and that the vehicle driving control process is partially different to be used for 4WS, the configuration is the same as that of the first embodiment. Thus, in the second embodiment, an explanation overlapping that in the first embodiment will be omitted, and the same points on the drawing will carry the same reference numerals, and only basically different points will be explained with reference to FIG. 8.

The vehicle driving control process performed by the ECU 100 as one portion of the vehicle driving control apparatus 1 in the embodiment will be explained with reference to FIG. 8. FIG. 8 is a control outline view showing the vehicle driving control process performed by the ECU in the embodiment.

The ECU 100 reads various signals including sensor signals or the like associated with the various sensors provided for the vehicle 10. The ECU 100 calculates or estimates, for example, a curve radius (or curvature of the target driving route), a yaw angle (or a yaw angle deviation), a lateral deviation (i.e. offset) and the like, on the basis of the read signals or the like.

Figure 8:
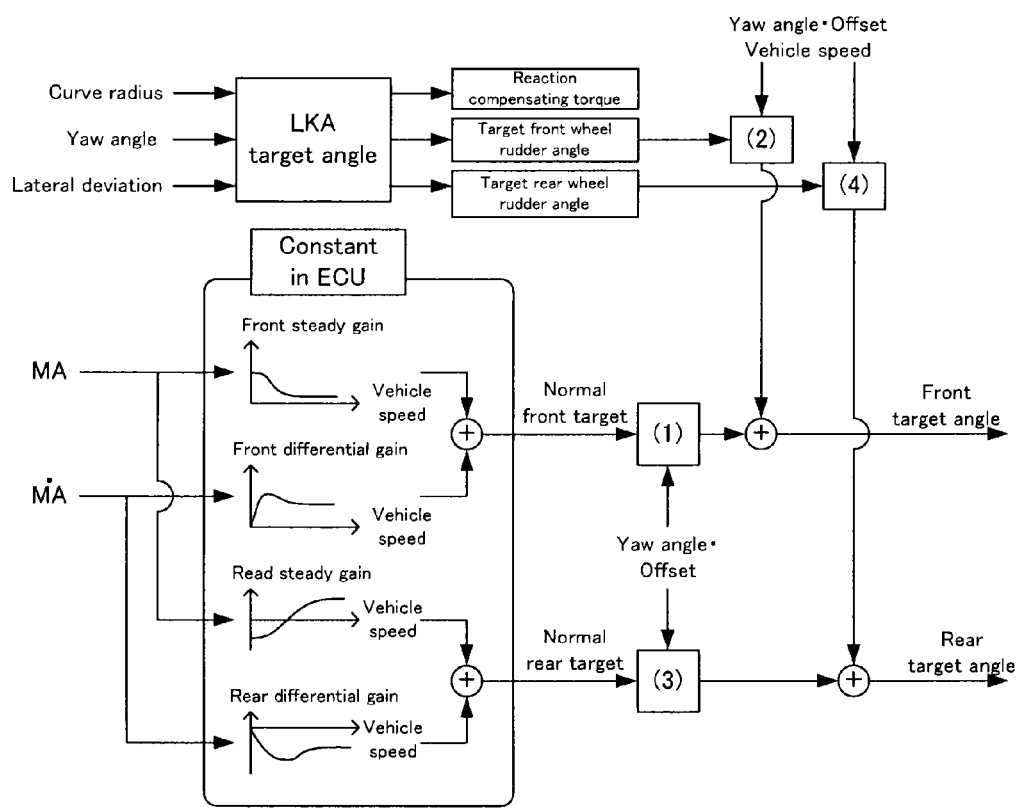
FIG. 8 is a control outline view showing a vehicle driving control process performed by an ECU in a second embodiment.

In FIG. 8, the ECU 100 calculates a reaction compensating torque, a target front wheel rudder angle, and a target rear wheel rudder angle on the basis of the curve radius, the yaw angle, and the lateral deviation. Incidentally, the "target front wheel rudder angle" and the "target rear wheel rudder angle" are other examples of the "control amount" of the present invention. Then, the ECU 100 corrects each of the calculated target front wheel rudder angle and the calculated target rear wheel rudder angle on the basis of the correction map as shown in FIG. 4 and the yaw angle, the offset, and the vehicle speed in each of FIGS. 8(2) and (4), and calculates a correction target front wheel rudder angle which is the corrected target front wheel rudder angle and a correction target rear wheel rudder angle which is the corrected target rear wheel rudder angle.

If the steering wheel 11 is not steered by the driver (i.e. if there is no override), the calculated correction target front wheel rudder angle and the calculated correction target rear wheel rudder angle are a final target angle for the front wheels and a final target angle for rear wheels, respectively. Incidentally, the final target angle for the front wheels is the VGRS final target angle. On the other hand, the final target angle for the rear wheels is a control amount associated with an actuator (not illustrated) for controlling a rudder angle of the rear wheels.

On the other hand, if the steering wheel 11 is steered by the driver (i.e. if there is override), the ECU 100 determines from a map or the like a basic front wheel target angle, which is a relative rudder angle of each of the front wheels FL and FR with respect to the steering angle MA, which is the rotation angle of the upper steering shaft 12, and a basic rear wheel target angle, which is a relative rudder angle of each of the rear wheels (not illustrated) with respect to the steering angle MA, on the basis of the steering angle MA and a steering angular velocity which is temporal differentiation of the steering angle MA, in parallel with the calculation of the correction target front wheel rudder angle and the correction target rear wheel rudder angle described above. Incidentally, the "basic front wheel target angle" and the "basic rear wheel target angle" in the embodiment are other examples of the "ratio of change" of the present invention.

Then, the ECU 100 corrects each of the determined basic front wheel target angle and the determined basic rear wheel target angle on the basis of the correction map as shown in FIG. 3 and the yaw angle and the offset in each of FIGS. 8(1) and (3), and calculates a correction front wheel target angle which is the corrected basic front wheel target angle and a correction rear wheel target angle which is the corrected basic rear wheel target angle.

Then, the ECU 100 sets an additional value of the calculated correction target front wheel rudder angle and the calculated correction front wheel target angle, as the final target angle for the front wheels. The ECU 100 also sets an additional value of the calculated correction target rear wheel rudder angle and the calculated correction rear wheel target angle, as the final target angle for the rear wheels.

The present invention is not limited to the aforementioned embodiments, but various changes may be made, if desired, without departing from the essence or spirit of the invention which can be read from the claims and the entire specification. A vehicle driving control apparatus, which involves such changes, is also intended to be within the technical scope of the present invention.

DESCRIPTION OF REFERENCE CODES 1 vehicle driving control apparatus
10 vehicle
11 steering wheel
12 upper steering shaft
100 ECU
200 VGRS actuator
300 VGRS driving apparatus

The invention claimed is:

1. A vehicle driving control apparatus comprising:
a rudder angle varying device capable of changing a relation between a steering angle, which is a rotation angle of a steering input shaft, and a rudder angle, which is a rotation angle of steered wheels; and
a trajectory controlling device for determining a control amount and controlling said rudder angle varying device such that a trajectory of a vehicle approaches a target driving route of the vehicle,
said vehicle driving control apparatus comprising:
a correcting device for correcting (i) a rate of change in the rudder angle with respect to a steering amount of the steering input or (ii) the determined control amount, in accordance with whether or not a steering direction of the steering input inputted to the steering input shaft through a steering member by a driver of the vehicle is identical with a rudder angle control direction of the control amount determined by said trajectory controlling device.

2. The vehicle driving control apparatus according to claim 1, wherein said correcting device corrects the rate of change in accordance with a driving state of the vehicle.

3. The vehicle driving control apparatus according to claim 2, wherein said correcting device performs the correction such that the rate of change increases in comparison with a case where the steering direction is identical with the rudder angle control direction, if the steering direction is different from the rudder angle control direction.

4. The vehicle driving control apparatus according to claim 1, wherein said correcting device performs the correction such that the rate of change increases in comparison with a case where the steering direction is identical with the rudder angle control direction, if the steering direction is different from the rudder angle control direction.

5. The vehicle driving control apparatus according to claim 4, wherein said correcting device corrects the determined control amount in accordance with a relation between the target driving route and an actual position of the vehicle.

* * * * *